UNITED STATES PATENT OFFICE.

OSCAR BALLY, OF MANNHEIM, AND HUGO WOLFF, OF LUDWIGSHAFEN-ON-THE-RHINE, GERMANY, ASSIGNORS TO BADISCHE ANILIN & SODA FABRIK, OF LUDWIGSHAFEN-ON-THE-RHINE, GERMANY, A CORPORATION.

NITROBENZANTHRONE COMPOUND AND PROCESS OF MAKING SAME.

No. 876,679.      Specification of Letters Patent.      Patented Jan. 14, 1908.

Application filed November 27, 1906. Serial No. 345,294.

*To all whom it may concern:*

Be it known that we, OSCAR BALLY and HUGO WOLFF, doctors of philosophy and chemists, respectively a citizen of the Swiss Republic and a subject of the Grand Duke of Baden, residing at Mannheim and Ludwigshafen-on-the-Rhine, Germany, have invented new and useful Improvements in Nitrobenzanthrone Compounds and Processes of Making the Same, of which the following is a specification.

We have discovered that compounds which contain a benzanthrone group, not being coloring matters, such, for instance, as benzanthrone itself and benzanthrone quinolin, and their derivatives, can, by means of a nitrating agent, such for instance as nitric acid, for which a nitrate and sulfuric acid may be used, be easily converted into their nitro compounds. The nitration is effected either in the presence of a solvent, or otherwise, and the products obtained vary according to the method of working employed, the said products being either homogeneous compounds, or mixtures of different nitro compounds, which can be separated from one another, for instance by crystallization from glacial acetic acid, or nitrobenzene. The new nitrobenzanthrone compounds are well characterized bodies and are of use in the preparation of coloring matters. They consist generally of from brown to green crystals or crystalline powders and are soluble in concentrated sulfuric acid yielding from yellowish red to brown solutions and in twenty-three per cent. oleum yielding from red to brown solutions.

The following examples will serve to illustrate further the nature of our invention and how it can be carried into practical effect, but our invention is not confined to these examples. The parts are by weight, and the temperatures are given in degrees centigrade.

Example 1. Introduce one hundred (100) parts of finely divided benzanthrone into eight hundred and fifty (850) parts of nitrobenzene and add, at ordinary temperature, sixty-six (66) parts of eighty-seven (87) per cent. nitric acid, whereupon the benzanthrone is dissolved, yielding a reddish-yellow solution. Warm the mixture for from two (2), to three (3), hours, at a temperature of from forty (40), to fifty (50), degrees and then allow it to cool, whereupon a mass of crystals is obtained. Dilute with alcohol, filter, and wash with alcohol. The raw product so obtained consists of a crystalline powder which can be recrystallized from glacial acetic acid, or from toluol, whereupon greenish yellow needles are obtained which melt at a temperature of two hundred and forty-four (244) degrees. Analysis points to their being mononitrobenzanthrone. The compound is soluble in most organic solvents yielding yellow solutions. It is soluble in concentrated sulfuric acid yielding a non-fluorescent golden yellow solution, and in twenty-three (23) per cent. oleum yielding a carmine solution which, upon warming, is converted into a dull olive-green.

Example 2. Boil together, in a reflux apparatus, twenty (20) parts of benzanthrone and three hundred (300) parts of glacial acetic acid and add, gradually, a solution of twenty (20) parts of eighty-seven (87) per cent. nitric acid in one hundred (100) parts of glacial acetic acid, so that the addition takes from two (2), to three (3), hours. Heat for about one (1) hour more until no more nitric acid fumes are evolved. The nitrobenzanthrone formed separates out partly during the reaction in greenish crystals and, upon cooling, a further quantity is obtained. Filter, wash with glacial acetic acid, and dry. Upon recrystallizing from glacial acetic acid and then from nitrobenzene small yellow needles are obtained which melt at a temperature of two hundred and ninety-eight (298) degrees. Analysis points to their being mononitrobenzanthrone. They yield a reddish yellow solution in twenty-three (23) per cent. oleum and this solution, upon warming, scarcely changes in color.

Example 3. Introduce ten (10) parts of benzanthrone quinolin into one hundred (100) parts of eighty-seven (87) per cent. nitric acid, at a temperature of from ten, to 15 (10-15), degrees, at the same time cooling the whole, and then allow the mixture to stand, at ordinary temperature, for from two (2), to three (3), days. The nitrobenzanthrone quinolin which is formed separates out of the solution in long yellow needles which can be filtered off by using an asbestos filter and then washed, first with sixty-two (62) per cent. nitric acid and then with water. The nitrobenzanthrone quinolin is a yellow powder difficultly soluble in most organic solvents, the solution being yellow. It can be recrystallized from nitrobenzene and obtained in glittering yellow leaflets which melt at a temperature of three hundred and thirty-one (331) degrees. Analysis points to its being mononitrobenzanthrone quinolin. It is insoluble in water and in dilute alkalies, slightly soluble in hot dilute acids and, from these solutions, can, by means of alkali, be precipitated in yellow flakes. It is soluble in concentrated sulfuric acid yielding a non-fluorescent golden yellow solution, and in twenty-three (23) per cent. oleum yielding a reddish yellow solution which does not alter upon being heated. Upon the addition of water to the mother liquor of the nitration mixture a similar product, melting at a temperature of two hundred and eighty-two (282) degrees, can be obtained.

Example 4. Introduce ten parts of benzanthrone quinolin sulfoacid into one hundred (100) parts of eighty-seven (87) per cent. nitric acid, while cooling, and allow the solution to stand, at ordinary temperature, for about twenty-four (24) hours, and, when a test portion shows that no unaltered sulfoacid is present, pour the solution onto ice. Filter, while cold, and wash with cold water. The nitrobenzanthrone quinolin sulfoacid obtained is a yellow powder difficultly soluble in cold water, but more easily soluble in hot water yielding a yellow solution. It is soluble in dilute caustic soda (the solution being yellowish brown) and in concentrated sulfuric acid and in twenty-three (23) per cent. oleum yielding yellow-brown solutions with slight dark green fluorescence.

Example 5. Introduce fifty (50) parts of benzanthrone into three hundred (300) parts of eighty-seven (87) per cent. nitric acid, maintaining the temperature at from five (5), to ten (10), degrees. The benzanthrone is dissolved yielding a reddish yellow solution. Then allow the solution to stand, at ordinary temperature, for about fifteen (15) hours, filter off the nitro compound which separates out, making use of an asbestos filter, and wash first with sixty-two (62) per cent. nitric acid and then with water. The compound obtained consists chiefly of dinitrobenzanthrone melting at a temperature of two hundred and sixty-eight (268) degrees. It is a green powder soluble in most organic solvents, the solution being yellow. Its solution in concentrated sulfuric acid is yellow with a slight green fluorescence, and in twenty-three (23) per cent. oleum the solution is yellowish red, which does not change on warming.

Example 6. Introduce twenty (20) parts of benzanthrone sulfoacid (prepared from anthraquinone-2-sulfoacid) into two hundred (200) parts of eighty-seven (87) per cent. nitric acid and allow the whole to stand, at ordinary temperature, for twenty-four (24) hours. Pour the solution into water, boil, and precipitate by means of common salt. Filter off the yellow flakes of nitrobenzanthrone sulfoacid, and wash, and press them. The compound obtained is a yellow powder which is easily soluble in hot water, the solution being yellow. Its solution in caustic soda is pale red, in concentrated sulfuric acid yellow-red with a yellow-green fluorescence, and in twenty-three (23) per cent. oleum reddish yellow without fluorescence. If desired, the benzanthrone sulfoacid can be nitrated in the presence of a solvent such, for instance, as sulfuric acid. Analogous products can also be obtained if other benzanthrone sulfoacids be treated in a similar manner, such for instance as that obtainable from anthraquinone-1-sulfoacid, or those obtainable by sulfonating benzanthrone.

Example 7. Dissolve twenty (20) parts of benzanthrone in four hundred (400) parts of ninety-seven (97) per cent. sulfuric acid and add, slowly, while stirring, at a temperature of from ten (10), to fifteen (15), degrees, the quantity of a nitrating acid (containing two hundred (200) grams of potassium nitrate per liter) theoretically necessary to convert the benzanthrone into the mononitro compound, and then warm the whole for from three (3), to four (4), hours, at a temperature of from fifty (50), to sixty (60), degrees. Allow the melt to cool and pour it onto ice, and filter off the product which separates out and wash, and dry it. The raw product so obtained is a greenish yellow powder which consists chiefly of a mixture of two mononitrobenzanthrones which melt at temperatures of two hundred and forty-four (244) and two hundred and ninety-eight (298) degrees respectively. It also contains small quantities of dinitrobenzanthrone which melts at a temperature of two hundred and thirty-six (236) degrees. If, in this example, double the quantity of nitrating acid be employed, a product is obtained which consists chiefly of the dinitrobenzanthrone described in example 5 and which melts at a temperature of two hundred and sixty-eight (268) degrees.

Example 8. Introduce ten (10) parts of benzanthrone quinolin into sixty (60) parts of nitrating acid (containing eighty-five (85) per cent. nitric acid and fifteen (15) per cent. sulfuric acid) at the same time cooling the whole. Then allow the solution to stand, at ordinary temperature, for about fifteen (15) hours and then heat for a further two (2), to three (3), hours at a temperature of from forty (40), to fifty (50), degrees. Allow the melt to cool, and pour it onto ice, and filter, wash, and dry, the nitro product which separates out. It is a yellow powder which is insoluble in water and in alkalies, somewhat soluble in hot dilute acids, yielding a yellow solution, and, from this solution, it can, by means of alkali, be precipitated in the form of yellow flakes. It is difficultly soluble in most organic solvents yielding yellow solutions. In concentrated sulfuric acid it yields a yellow solution, and in twenty-three (23) per cent. oleum a nonfluorescent reddish yellow solution. Upon re-crystallization from nitrobenzene small glittering brown needles are obtained which melt at a temperature above three hundred and forty (340) degrees. Analysis points to their being a dinitro compound.

Now what we claim is:

1. The process of producing nitrobenzanthrone compounds by treating a hereinbefore defined benzanthrone body with nitric acid.

2. The process of producing nitrobenzanthrone compounds by treating a hereinbefore defined benzanthrone body with nitric acid in the presence of a solvent.

3. As new articles of manufacture the nitrobenzanthrone compounds which can be obtained by treating a hereinbefore defined benzanthrone body with nitric acid which new compounds can be obtained in the form of from yellow to green crystals which are soluble in concentrated sulfuric acid yielding from brown to yellow red solutions and in twenty-three per cent. oleum yielding from brown to red solutions.

4. As a new article of manufacture nitrobenzanthrones which can be obtained by treating benzanthrone with nitric acid in nitrobenzene solution which new compound can be obtained in the form of greenish yellow needles melting at a temperature of about two hundred and forty-four degrees centigrade and which is soluble in concentrated sulfuric acid yielding a non-fluorescent golden yellow solution and in twenty-three per cent. oleum yielding a carmine solution which upon warming is converted into a dull olive-green.

In testimony whereof we have hereunto set our hands in the presence of two subscribing witnesses.

OSCAR BALLY.
HUGO WOLFF.

Witnesses:
J. ALEC. LLOYD,
H. W. HARRIS.